Reissued Oct. 20, 1942 Re. 22,207

UNITED STATES PATENT OFFICE 22,207

PRODUCTION OF HARD METAL ALLOYS, ESPECIALLY FOR TOOLS

Paul Schwarzkopf, Yonkers, N. Y., assignor to The American Cutting Alloys, Inc., New York, N. Y., a corporation of Delaware No Drawing. Original No. 1,959,879, May 22, 1934, Serial No. 656,103, February 10, 1933. Application for reissue August 8, 1941, Serial No. 406,050

8 Claims. (Cl. 75—137)

This invention relates to a method of producing a hard metal composition, particularly for tool elements.

This application forms a continuation in part of my co-pending applications Serial No. 452,132 filed May 13, 1930, and Serial No. 625,042, filed July 27, 1932, and issued into Patent No. 2,091,017.

It is known in the production of highly efficient hard tools to employ carbides of tungsten or molybdenum prepared by sintering these components, pulverizing the product and pressing the powder in moulds which are subsequently highly heated. It is also known to add a considerably lower melting auxiliary metal to the carbide of tungsten and then to sinter the whole in order to obtain tool materials which, besides being extremely hard, are tough as well.

The present invention relates more particularly to a method of producing a tool material comprising a consolidated product containing at least two carbides for instance of tungsten, molybdenum (i. e. an element of the sixth group of the periodic system), boron (i. e. an element of the third group of the periodic system), titanium, (i. e. an element of the fourth group of the periodic system) and vanadium (i. e. an element of the fifth group of the periodic system) which are essentially or entirely compounded into mixed crystals by heating to a sufficient extent, and auxiliary metal in the amount of about 3 to 20% of one or more metals of the groups containing nickel, cobalt. A mixed crystal is a homogeneous solid solution of two (or more) substances capable of dissolving one in the other. With crystalline carbide substances capable of forming solid solutions, the latter form homogeneous carbide crystal structures, each of which contains atoms of two or more different elements, besides atoms of carbon required to form carbide with those elements. Such carbide solutions exhibit properties which are very desirable particularly in tool materials.

Thus, experiments have demonstrated and science has given the rule that the hardness of the mixed crystals or solid solutions exceeds that of the solvent substance or element and is a function of the proportion in which the elements are present in the mixed crystal, and that this function possesses a maximum. Plotting in a graph the hardness of the solid solution of two metals against their concentration in solid solution, it generally appears that the hardness increases with the concentration to a flat maximum of the hardness-composition-graph, and if the solid solubility is in excess of the equi-atomic ratio of the component metals, the flat maximum occurs within a range of 5% to 10% on either side of this ratio. (Kurnakow and Zemczuzny, Zeitschrift für anorganische Chemie," 1908, volume 60, page 1, and 1910, volume 68, page 123; the standard textbook of Reinglass "Chemische Technologie der Legierungen," second edition, pages 52, 53; Jeffries and Archer, "The Science of Metals," 1924, pages 254 ff.; and M. v. Schwarz, "Metall- und Legierungskunde," second edition (1929), page 49.)

It is particularly advantageous to produce for use in the present invention carbide mixed crystals or solid solutions of two (or more) different elements in a ratio which lies in, or close to the range of maximum hardness and thereby to further increase the overall or average hardness of the completed hard metal.

For illustration of the analogous application to carbide crystal substances of the above rules pertaining to approximately greatest hardness of solid solutions of two elements or metal substances, let me take an alloy comprising 10% auxiliary metal and therefore 90% carbide substance. Let me further assume that tungsten-carbide and titanium-carbide are to be compounded to form the theoretically hardest solid solutions. Then we have to divide these 90% in the equi-molecular ratio of 60:196 of the component carbide compounds TiC and WC (which corresponds to the equi-atomic ratio of elements in solid solution), and we have to take about 20% (by weight) titanium-carbide, about 70% tungsten-carbide and about 10% auxiliary metal.

In the above example 10% auxiliary metal are chosen only for sake of simplicity. But the amount of auxiliary metal taken essentially, i. e. completely or almost completely, from the iron group (nickel, cobalt, iron) singly or in suitable mixture, can vary between about 3% and 22%. The amount may be smaller if heavy mixtures of carbides (e. g. tungsten-, molybdenum-carbide) are concerned and larger if lighter mixtures of carbides (e. g. with titanium-carbide) are concerned.

Other compositions the overall or average hardness of which is increased by compounding the carbides substantially or entirely into solid solutions are for instance the following: 50 to 70% titanium-carbide, 40 to 20% vanadium-carbide, 5 to 20% auxiliary metal; 35 to 50% titanium-carbide, 60 to 40% boron-carbide, 5 to 20% auxiliary metal; 15 to 25% titanium-carbide, 75 to 55% tungsten-carbide; 5 to 20% auxiliary metal.

The auxiliary metals are believed to increase the toughness of the alloy or tool material produced.

For special purpose, e. g. for heavy cuts, a composition containing titanium-carbide and molybdenum-carbide in about equal proportions (by weight) forming substantially solid solutions of great hardness and nickel up to 9 and 15% and chromium up to 1 and 2% as auxiliary metals appeared suitable.

But I have found also surprising good results by forming substantially solid solutions of about 30 to 15% molybdenum-carbide ($Mo_2C$), of the sixth group, and about 65 to 70% titanium-carbide (TiC) of the fourth group, adding hereto as auxiliary metals 8 to 15% nickel and 0 to 2% chromium. Within this range the optimum e. g. for high speed work seems to be about 8 to 10% nickel and up to 1 to 2% chromium.

In every case I found that substantial amounts of the homogeneous carbide crystal structure (carbide solid solutions) of titanium (of the fourth group of the periodic system) combined with e. g. tungsten and/or molybdenum (of the sixth group), is sufficient to present the advantages of titanium carbide, e. g. of high resistance against oxidation at elevated temperature, great hardness and relatively small specific weight.

According to the present invention the carbide solid solutions or homogeneous carbide crystal structures containing atoms of two or more different elements other than carbon selected from the third through sixth group of the periodic system in addition to carbon atoms required to form carbide therewith, which form entirely or substantially the carbide substance of the hard metal composition, are produced by heat treatment to sufficient extent in a first cycle and thereafter admixed with and then cemented by considerably lower melting auxiliary metal essentially of the iron group which melts considerably below the carbide substance in a sintering process of a second cycle. Thus, carbides of two selected different elements, e. g. of tungsten and molybdenum are suitably comminuted, mixed and heated in a first cycle to a temperature between and including sintering and fusing temperature, particularly up to about 1600° to about 2000° C. for about 1 to 2 hours and in any event until they have been compounded substantially or entirely into solid solutions; the carbide substance is then comminuted again, if necessary, and intimately and uniformly mixed with auxiliary metal in powdery state, said metal melting considerably below the carbide substance and taken essentially, i. e. completely or almost completely from the iron group, preferably in finely divided form. The mixture so obtained is then molded, i. e. shaped and preferably pressed, and finally sintered by heating in a second cycle to a temperature up to about 1400° to about 1600° C. for one or more hours or a substantial or major part of one hour, so that upon cooling a substantially dense and tough body is obtained in which the desired carbide crystal structures including solid solutions are distributed as uniformly as possible. During sintering the auxiliary metal is believed to act as sintering-aid and in the completed body as a metal cement.

Instead of starting the first cycle with completed carbides only, one may also start from component elements of carbide structures to be formed. Thus one may mix oxides of the selected elements, e. g. again of molybdenum and tungsten, in finely divided form with suitably pulverized carbon and heat the mixture to sufficient extent, for instance in an electric furnace, until the oxides are reduced to their metallic state and the metals so obtained carburized and substantially compounded into solid solutions; in the example given carbide crystal structures of tungsten and molybdenum substantially or entirely in solid solution are obtained.

Another method of preparing the mixed crystals consists therein to mix very finely divided molybdenum and tungsten metal powder and to expose this mixture with a suitably great surface to a current of carburising gas at comparatively low temperature, whereby these metals are carburized. It is well-known that molybdenum-metal can be carburized in the presence of carburizing gas already from 800° C. and tungsten metal already from about 1000° C., so that the treatment in question will be made at about 1000° C. The intimate mixture of carbides of molybdenum and tungsten is now to be compounded substantially into solid solutions by raising the temperature to sufficient extent, e. g. again to about 1600° to about 2000° C.

The carbides of the selected different elements and solid solutions of them obtained in any way described, or any other suitable way, are thereafter intimately admixed with powdery lower melting auxiliary metal or metals essentially of the iron group in an amount of about 3% to about 22%, shaped and finally sintered at temperatures and periods stated above, in any event until a substantially dense and tough body is obtained.

If carbide crystal structures obtained in the first cycle are too coarse, they are suitably pulverized before the auxiliary metal is admixed.

In all the processes mentioned, before or during final sintering, and particularly during molding (shaping), the powdery mixture of carbide crystal structures and auxiliary metal may be subjected to suitable pressure, up to several atmospheres per square centimeter, say up to 50 and 75 atmospheres and higher. In pressing the mixture in suitable molds to a shape similar to the desired shape, the shrinking is to be taken into calculation which occurs during the following heat treatment.

If for the purpose of the invention completed carbide is used in the first cycle, it may be produced in any known and suitable manner. If titanium carbide is used in the initial mixture besides other elements, a grade as free as possible of oxygen and containing up to about 20% carbon (which somewhat exceeds the theoretical amount) is preferred.

It is advantageous to use titanium oxide, powdering and mixing it with carbon, and heating the mixture until the oxide is reduced to titanium and the latter combined with carbon. To this product additional carbon may be admixed and heating repeated until no further carbon-monoxide resulting from reducing the titanium oxide evaporates. The admixture of carbon in the form of lamp black is preferred, and heating of the titanium oxide and carbon may be extended for about one to two hours in a hydrogen stream at about 1500° to 1700° C. in a carbon tube. Higher temperatures above about 1900° C.; application of a very high vacuum, and/or heating by electrical induction (high frequency) are often advantageous to obtain a titanium carbide free of oxygen.

An electric furnace can be employed for effecting the heating in the first cycle and sintering in the second cycle; heating may also be carried out by means of high frequency currents. In some cases particularly good results are obtained by carrying out the heating in the first cycle or sintering in a vacuum. For sintering in a mold also heavy electrical current may be led through the shaped body and/or around the latter through the mold. Any other kind of heating is suitable.

Whatever be the procedure in the preformation of the carbide mixed crystals and subsequent consolidation of the carbide substance with auxiliary metal, in any case a cemented body is eventually obtained which is superior in hardness or other respects to one containing the mechanical mixture of carbides only.

In case, however, difficult forms of the body are to be produced not achievable by usual moulds, or in case sharp edges are desired, or angles difficult to manufacture in such way, so that the mechanical working or finishing of the hard metal-body is needed after sintering, then the following ways are preferable.

The pressed and preformed body is to be subjected to sintering temperatures as mentioned before, but such sintering has to be done only for a short period of time, say 1 to 5 to 10 minutes so that the particles are sufficiently fritted together to withstand mechanical treatment without presenting, however, the hardness of the fully sintered body. Such body is then subjected to finishing in any way and then sintering at the same temperatures is continued till the fully sintered body is achieved.

Another way consists in having admixed to the powders ready for preshaping glycerine, glycole or other alcohols, shaped this mixture and, if desired, pressed and treated at elevated temperature of about 100 to 200° C. but as best below 180° C., then worked and finished this body of sufficient cohesion whereupon sintering is possible without any further interruption.

For sake of clearness I expressively state that the consolidation of the body can be done in the presence of auxiliary metals being heated and alloying with the carbides present more or less superficially or not at all, as the case may be due to the relative properties of the auxiliary metal and carbide present.

Hard compositions prepared according to the invention and used for tools, form as a rule, not the entire tool, but merely the part of the tool which in practice is used directly for cutting, drilling etc. and is subject to wear.

When in the appended claims I refer to carbide crystal structures of elements other than carbon selected from the third through sixth group of the periodic system, I mean those known carbides adapted for use in hard tool elements, having a suitable hardness and being refractory, i. e. are of considerably higher melting point than the auxiliary metal and neither decomposed by air, or water or other liquid employed for cooling or similar purposes at operation temperatures nor by any of the heat treatments at elevated temperatures of the order stated hereinbefore. Particular ones of those known carbides have been cited hereinbefore, among them titanium carbide as outstanding as to its quality of forming solid solutions or homogeneous carbide crystal structures with other known hard and refractory carbide substances, as exemplified (but not by way of limitation) by the carbides of tungsten, molybdenum, vanadium and boron; the resulting homogeneous carbide crystal structures are relatively light in weight, very hard, and of great resistance against physical and chemical attacks such as corrosion (oxidation) at elevated operation temperatures. In the final product, the carbide solid solutions or homogeneous carbide crystal structures either form entirely or essentially the carbide mass present; in the latter event in addition to those carbide solid solutions also simple hard and refractory carbides are present.

What I claim is:

1. In a method of producing a hard metal composition, particularly for tool elements, containing hard and refractory carbide crystal structures of at least two different elements other than carbon selected from the third, fourth, fifth and sixth group of the periodic system and considerably lower melting auxiliary metal substantially of the iron group in amounts from about 3 to 22%, the steps of preforming said structures substantially in solid solution in a first cycle including a heat treatment at a temperature of about 1600° to about 2000° C. and consolidating in a subsequent cycle the mass so obtained with the auxiliary metal admixed in powdery state, by heat treatment at elevated temperature up to about 1400° to about 1600° C.

2. In a method of producing a hard metal composition, particularly for tool elements, containing hard and refractory carbide crystal structures of at least two different elements other than carbon selected from the third, fourth, fifth and sixth group of the periodic system and considerably lower melting auxiliary metal substantially of the iron group in amounts from about 3 to 22%, the steps of forming substantially solid solutions of said structures by mixing them and heat-treating the mixture at a temperature of about 1600° to 2000° C., intimately mixing the mass so obtained with the auxiliary metal in powdery state and sintering this mixture at elevated temperature up to about 1400° to 1600° C.

3. In a method of producing a hard metal composition, particularly for tools or tool elements, containing in substantial amounts hard and refractory carbide crystal structures of at least two different elements other than carbon selected from the third, fourth, fifth and sixth group of the periodic system and considerably lower melting auxiliary metal substantially of the iron group in amounts from about 3 to 22%, the steps of forming solid solutions of said structures by mixing them and heat-treating the mixture at a temperature of about 1600° to about 2000° C., finely powdering and intimately mixing the mass so obtained with powdered auxiliary metal, and subsequently sintering this mixture at elevated temperature up to about 1400 to about 1600° C.

4. In a method of producing a hard metal composition, particularly for tool elements, the steps of forming by heat treatment hard and refractory carbide crystal structures of carbon and at least two different elements other than carbon selected from the third through sixth group of the periodic system so that substantially carbide crystal structures are obtained homogeneously containing atoms of at least two different elements selected from said groups in addition to carbon atoms required to form carbide therewith, said heat treatment extended for this purpose to a temperature of about 1600° to about 2000° C., comminuting and intimately admixing the carbide substance so obtained with considerably lower melting powdery auxiliary metal essentially of the iron group in an amount of about 3 to about 22%, and heat treating said mixture at a temperature elevated up to about 1400 to about 1600° C., so that on cooling a substantially dense and tough body results.

5. In a method of producing a hard metal composition, particularly for tool elements, the steps of forming by heat treatment hard and refractory carbide crystal structures of carbon and at least two different elements other than carbon selected from the third through sixth group of the periodic system so that substantially carbide crystal structures are obtained homogeneously containing atoms of at least two different elements selected from said groups in addition to carbon atoms required to form carbide therewith, said heat treatment extended for this purpose to a temperature of about 1600 to about 2000° C., comminuting and intimately admixing the carbide substance so obtained with considerably lower melting powdery auxiliary metal essentially selected from the group consisting of cobalt and nickel in an amount of about 3 to about 22%, shaping and heat treating said mixture at a temperature elevated up to about 1400 to about 1600° C., so that on cooling a substantially dense and tough body results.

6. In a method of producing a hard metal composition, particularly for tool elements, the steps of forming by heat treatment hard and refractory carbide crystal structures of carbon and at least two different elements other than carbon selected from the third through sixth group of the periodic system so that substantially carbide crystal structures are obtained homogeneously containing atoms of at least two different elements selected from said groups in addition to carbon atoms required to form carbide therewith, said heat treatment extended for this purpose to a temperature of about 1600 to about 2000° C., comminuting and intimately admixing the carbide substance so obtained with considerably lower melting powdery auxiliary metal essentially of the iron group in an amount of about 3 to about 22%, pressing and heat treating said mixture, at a temperature elevated up to about 1400 to about 1600° C., so that on cooling a substantially dense and tough body results.

7. In a method of producing a hard metal composition, particularly for tool elements, substantially composed of hard and refractory carbide crystal structures of at least two different elements other than carbon selected from the third through sixth group of the periodic system and always of titanium, and considerably lower melting auxiliary metal substantially of the iron group in amounts from about 3% to 22%, the steps of preforming by heat treatment hard and refractory carbide crystal structures of titanium carbon and at least one other element, other than carbon, selected from said groups so that substantially carbide crystal structures are obtained homogeneously containing atoms of titanium and said other selected element or elements in addition to carbon atoms required to form carbide therewith, said heat treatment extended for this purpose to a temperature of about 1600° to about 2000° C., comminuting and intimately admixing the carbide substances so obtained with powdery auxiliary metal substantially of the iron group in an amount of about 3% to 22%, shaping under pressure and finally sintering by heat treatment said mixture at a temperature elevated up to about 1400° to 1600° C., so that on cooling a substantially dense and tough body results.

8. In the manufacture of hard metal compositions, particularly for tool elements, by finely comminuting and admixing hard and refractory carbide crystal structures with powdery auxiliary metal essentially of the iron group in an amount of about 3% to 22%, shaping under pressure and sintering the mixture by heat treatment at a temperature elevated up to about 1400° to 1600° C.: the step of preforming, before admixing with powdery auxiliary metal, by heat treatment hard and refractory carbide crystal structures of carbon, titanium, and at least one other element selected from the group consisting of tungsten, molybdenum, vanadium and boron, so that substantially carbide crystal structures are obtained homogeneously containing atoms of titanium and at least one element selected from said group in addition to carbon atoms required to form carbide therewith, said heat treatment extended to a temperature of about 1600° to about 2000° C.

PAUL SCHWARZKOPF.